US009422183B2

(12) United States Patent
Lammi et al.

(10) Patent No.: US 9,422,183 B2
(45) Date of Patent: Aug. 23, 2016

(54) GLASS TEMPERING FURNACE

(71) Applicant: TAIFIN GLASS MACHINERY OY, Tampere (FI)

(72) Inventors: Petri Juhani Lammi, Kyröskoski (FI); Esa Ensio Lammi, Tampere (FI); Jarno Tapio Nieminen, Kyröskoski (FI); Jukka Tapani Sääksi, Nokia (FI)

(73) Assignee: TAIFIN GLASS MACHINERY OY, Tampere (FI)

( * ) Notice: Subject to any disclaimer, the term of this patent is extended or adjusted under 35 U.S.C. 154(b) by 0 days.

(21) Appl. No.: 14/284,666

(22) Filed: May 22, 2014

(65) Prior Publication Data

US 2014/0345331 A1 Nov. 27, 2014

(30) Foreign Application Priority Data

May 23, 2013 (FI) ..................................... 20135553
Nov. 14, 2013 (FI) ..................................... 20136119

(51) Int. Cl.
*C03B 27/04* (2006.01)
*C03B 25/04* (2006.01)
*C03B 27/044* (2006.01)
*C03B 29/08* (2006.01)

(52) U.S. Cl.
CPC ............... *C03B 27/044* (2013.01); *C03B 29/08* (2013.01)

(58) Field of Classification Search
CPC .... C03B 29/08; C03B 27/04; C03B 27/0404; C03B 27/0413; C03B 27/0417; C03B 27/044
See application file for complete search history.

(56) References Cited

U.S. PATENT DOCUMENTS

| | | | | |
|---|---|---|---|---|
| 3,332,759 | A * | 7/1967 | McMaster et al. | 65/25.2 |
| 3,393,062 | A * | 7/1968 | Hesten et al. | 65/115 |
| 4,200,446 | A * | 4/1980 | Koontz | 65/25.3 |
| 4,824,464 | A | 4/1989 | Perin et al. | |
| 4,871,385 | A * | 10/1989 | Lecourt et al. | 65/115 |
| 5,647,882 | A * | 7/1997 | Thiessen | 65/348 |
| 6,776,008 | B1 * | 8/2004 | Vehmas et al. | 65/119 |
| 7,178,367 | B2 * | 2/2007 | Honjo et al. | 65/182.2 |
| 7,320,187 | B2 * | 1/2008 | Bancon et al. | 34/639 |

(Continued)

FOREIGN PATENT DOCUMENTS

| | | |
|---|---|---|
| EP | 0 937 687 A2 | 8/1999 |
| EP | 2 368 855 A2 | 9/2011 |

(Continued)

OTHER PUBLICATIONS

Oct. 15, 2014 Extended Search Report issued in European Application No. 14168956.2.
Feb. 12, 2016 Office Action issued in European Patent Application No. 14168956.2.

*Primary Examiner* — Jodi C Franklin
(74) *Attorney, Agent, or Firm* — Oliff PLC

(57) ABSTRACT

A glass tempering furnace for heating glass sheets (5). The glass sheet (5) is led in the glass tempering furnace (1), and the glass sheet (5) is heated in the glass tempering furnace (1) by blowing heating air on the surface of the glass sheet (5) with at least two separate heating air streams in the substantially transverse direction in relation to the direction of travel of the glass sheet (5).

9 Claims, 3 Drawing Sheets

(56) References Cited

U.S. PATENT DOCUMENTS

| | | | | |
|---|---|---|---|---|
| 2004/0261457 | A1* | 12/2004 | Vehmas | 65/29.19 |
| 2010/0031703 | A1* | 2/2010 | Lammi et al. | 65/181 |
| 2010/0251773 | A1* | 10/2010 | Vehmas | 65/104 |
| 2011/0167871 | A1* | 7/2011 | Vehmas et al. | 65/25.2 |
| 2011/0219822 | A1* | 9/2011 | Anttonen et al. | 65/355 |
| 2011/0277506 | A1* | 11/2011 | Lewandowski et al. | 65/90 |
| 2014/0345330 | A1* | 11/2014 | Lammi et al. | 65/114 |

FOREIGN PATENT DOCUMENTS

| | | | |
|---|---|---|---|
| FI | 120972 | B | 5/2010 |
| WO | 03/006390 | A1 | 1/2003 |
| WO | WO 2005/097694 | | 10/2005 |
| WO | WO 2008/071833 | A1 | 6/2008 |
| WO | WO 2009/060120 | A1 | 5/2009 |
| WO | 2009/101648 | A1 | 8/2009 |

* cited by examiner

GLASS TEMPERING FURNACE

BACKGROUND OF THE INVENTION

The invention relates to a glass tempering furnace.

As glass sheets are heated in a glass tempering furnace, the aim is to heat them as evenly as possible. Any unevenness in the temperature of a glass sheet will result in tension in it and consequently optical errors in the glass. To establish as even as possible a thermal effect, the aim is to adjust the temperature profile of the glass sheet in a diversified way.

BRIEF DESCRIPTION OF THE INVENTION

It is an object of the present invention to provide a new type of glass tempering furnace.

The solution according to the invention is characterised by what is disclosed in the independent claim. Some embodiments of the invention are disclosed in the dependent claims.

In the solution set forth, the glass sheet is led to a glass tempering furnace and heated in the glass tempering furnace by blowing heating air on the surface of the glass sheet in the substantially transverse direction in relation to the direction of travel of the glass sheet with at least two separate heating air streams. By blowing heating air onto the glass sheet surface in the substantially transverse direction in relation to the direction of travel of the glass sheet with at least two separate heating air streams, it is possible to make the distribution of the heating air on the surface area of the glass sheet more even than before in the transverse direction of the glass sheet.

According to an embodiment, the temperature profile of the glass sheet is adjusted in the substantially transverse direction in relation to the direction of travel of the glass sheet by separately adjusting the separate heating air streams blown on the glass sheet surface, whereby the blowing of the heating air makes it possible to affect the temperature profile of the glass sheet in its transverse direction.

BRIEF DESCRIPTION OF THE DRAWINGS

The invention is now described in closer detail in connection with preferred embodiments, with reference to the accompanying drawings, in which.

For the sake of clarity, the figures show some embodiments of the invention in a simplified manner. In the figures, like reference numerals identify like elements.

DETAILED DESCRIPTION OF THE INVENTION

Figure 1:
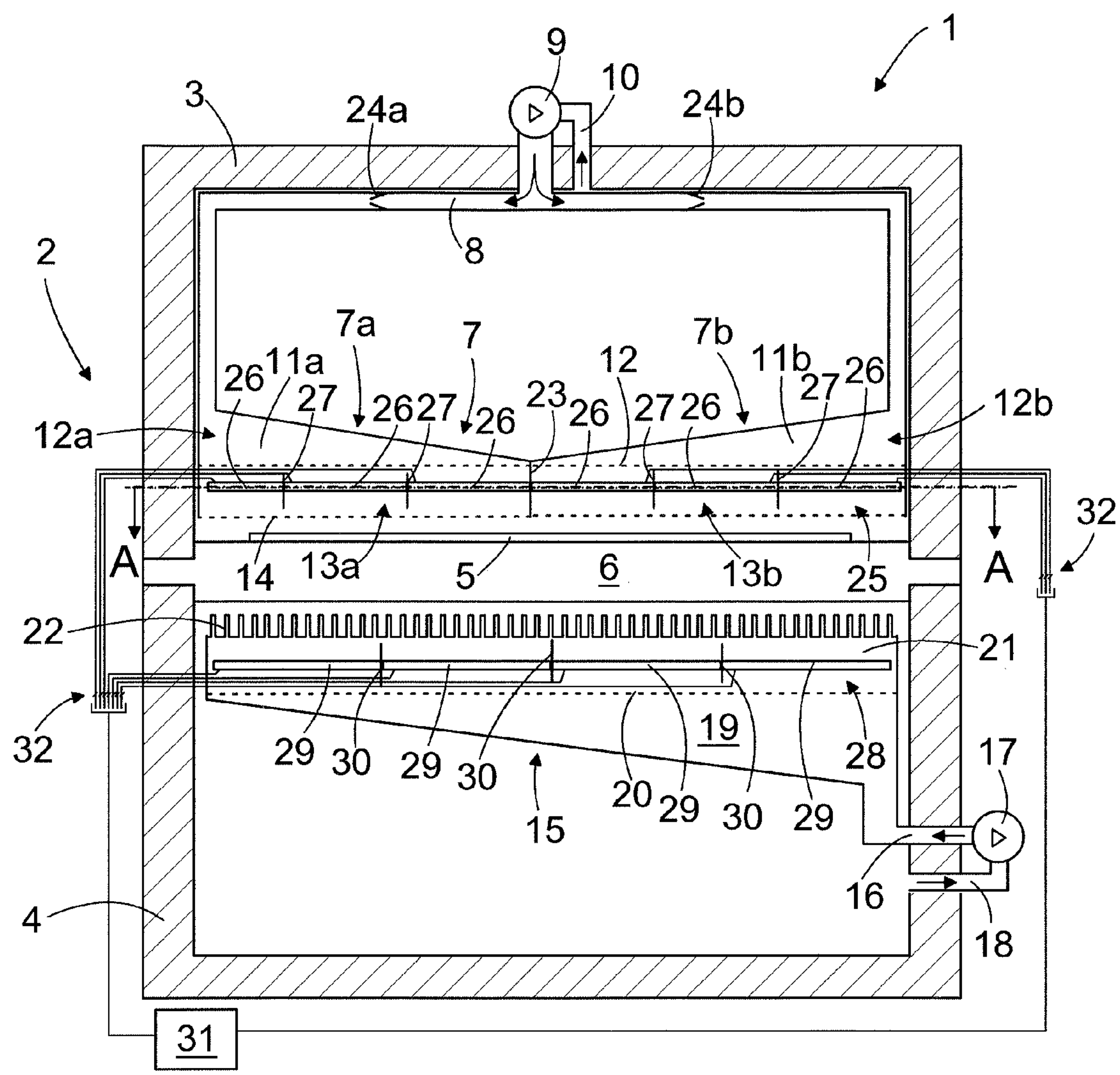
FIG. 1 is a schematic cross-sectional end view of a glass tempering furnace.
Figure 2:
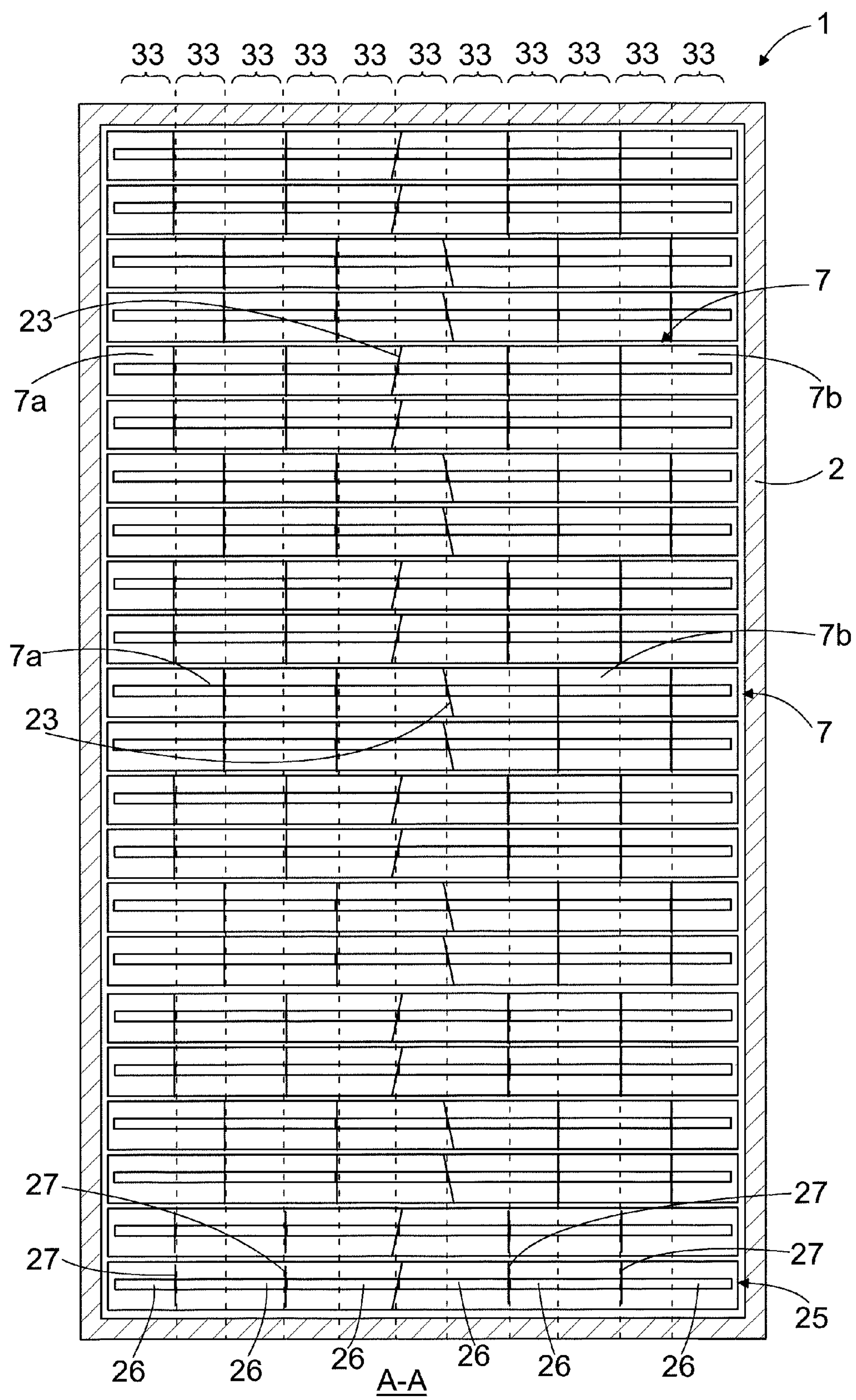
FIG. 2 is a schematic cross-sectional top view of a glass tempering furnace according to FIG. 1.

FIG. 1 is a schematic cross-sectional end view of a glass tempering furnace 1. FIG. 2 is a schematic top view of the of the glass tempering furnace 1 of FIG. 1 and cut along line A-A of FIG. 1.

The tempering furnace 1 has a frame 2 which comprises a top part 3 and a bottom part 4, which may be separate from one another so that the top part 3 may be moved in the vertical direction of the tempering furnace 1 away from the bottom part 4 and towards it. FIG. 1 shows the tempering furnace 1 in an operating situation where the top part 3 of the tempering furnace 1 is in contact with the bottom part 4. When the top part 3 of the tempering furnace 1 is lifted up, that is, away from the bottom part 4, a gap is established between the top part 3 and the bottom part 4, in connection with which means can be arranged to prevent the flow of the blast air used for heating the glass sheet 5 out of the tempering furnace 1 when the top part 3 has been lifted away from the bottom part 4. Deviating from what is presented in the above, the top part 3 and the bottom part 4 of the tempering furnace may also form one uniform structure.

The tempering furnace 1 further has rolls 6, supported in connection with the frame 2. Typically, the rolls 6 are ceramic rolls 6, forming a conveyor of the tempering furnace 1, on which the glass sheets 5 are taken to the tempering furnace 1 and out of it. At the time the glass sheet 5 is being heated, the rolls 6 are typically controlled in such a manner that the glass sheet 5 is oscillated back and forth in the tempering furnace 1 by the conveyor formed by the rolls 6. For reasons of clarity, the figures do not show means known per se for a person skilled in the art to rotate, drive or control the rolls 6. Instead of the conveyor formed by the rolls 6, the tempering furnace 1 may also make use of other conveying methods to carry the glass sheets 5.

The tempering furnace 1 further has blowing channels 7, or upper blowing channels 7 of the top part 3, positioned in the space restricted by the top part 3 and located above the glass sheet 5, which are arranged to blow warm or hot air, that is, heating air, on the top surface of the glass sheet 5 in order to heat the glass sheet 5. Preferably, there are several successive said blowing channels 7 in the direction of travel of the glass sheet 5, that is, in the longitudinal direction of the tempering furnace 1. The air that is blown against the surface of the glass sheet 5 may be heated with heating resistors, described below, or in addition to them or instead of them, with other means which can be placed inside or outside of the tempering furnace 1 and which are known per se for a person skilled in the art. The blowing channels 7 are arranged substantially transverse in relation to the direction of travel of the glass sheets 5 so that they blow heating air to the top surface of the glass sheet 5 in the substantially transverse direction in relation to the direction of travel of the glass sheets 5. In this context, the definition substantially transverse means in an embodiment that the blowing channels 7 in the top part 3 are at a 70-110 degree angle with respect to the direction of travel of the glass sheets 5. According to another embodiment, the blowing channels 7 in the top part 3 are at an 80-100 degree angle with respect to the direction of travel of the glass sheets 5. According to yet another embodiment, the blowing channels 7 in the top part 3 are at an 85-95 degree angle with respect to the direction of travel of the glass sheets 5.

In the tempering furnace 1 according to FIGS. 1 and 2, the blowing channel 7 in the top part 3 is formed in the lateral direction of the tempering furnace 1, that is, in the substantially transverse direction in relation to the direction of travel of the glass sheet 5, out of two parts, that is, a part 7*a* located on the left as seen in FIGS. 1 and 2, and a part 7*b* located on the right, whereby the part 7*a* of the blowing channel 7 is arranged to blow heating air on the top surface of the glass sheet on its left part, and the part 7*b* of the blowing channel 7 is arranged to blow heating air on the top surface of the glass sheet 5 on its right part. The heating air is fed to the blowing channel 7 through a feeding channel 8. The tempering furnace 1 additionally has a blower 9, used to feed the air to the feeding channel 8. The air is fed from the top part of the tempering furnace 1 back to the blower 9 through a return channel 10.

The blowing channel 7 has, in the top sections of its parts 7*a*, 7*b*, feed parts 12*a*, 12*b* of the blowing channel. The feed parts 12*a*, 12*b* of the blowing channel 7 are wider at their forward end, that is, at the ends of the feeding channel 8, and become narrower towards the end in the direction of the flow, in other words, towards the middle part of the tempering furnace 1. This way, air can be fed evenly along the entire length of the part 7*a*, 7*b* of the blowing channel 7. On the bottom surface of the feed parts 12*a*, 12*b*, there is a perforated plate 12 through which air flows to blow parts 13*a*, 13*b*, corresponding to parts 7*a*, 7*b* of the blowing channel 7. The ends 23 of the blow parts 13*a*, 13*b* of the blowing channel 7 are face to face. On the bottom surface of the blowing channel 7, that is, at the bottom part of the blow parts 13*a*, 13*b*, there is a nozzle plate 14. The nozzle plate 14 may be a perforated plate, in other words one having holes through which air can flow towards the glass sheet 5. Through the parts 7*a*, 7*b* of the blowing channel 7, it is possible to aim separate heating air streams on the glass sheet 5 in the substantially transverse direction in relation to the direction of travel of the glass sheet 5, whereby a more even distribution than previously of the heating air on the surface of the glass sheet in its transverse direction is achieved. When the blowing channels 7 in the top part 3 of the tempering furnace 1 are formed out of at least two parts 7*a*, 7*b* in the substantially transverse direction in relation to the direction of travel of the glass sheet 5, the potential thermal expansion of the blowing channels 7 may be more easily controlled.

It is additionally possible to arrange an adjustment in the tempering furnace 1 to separately adjust said separate heating air streams whereby, by means of blowing heating air, the temperature profile of the glass sheet 5 may be adjusted in the transverse direction of the glass sheet 5, that is, in the transverse direction in relation to the direction of travel of the glass sheet 5. The flow of heating air may be adjusted, for example, with valves 24*a*, 24*b* whereby by adjusting the opening of the valves 24*a*, 24*b* it is possible to separately adjust the amount of air stream blown against the glass sheet 5 through the different parts 7*a*, 7*b* of the blowing channel 7.

In the embodiment of FIG. 1, there is shown a common blower 9 for the parts 7*a*, 7*b* of the blowing channel 7, but if there are separate blowers for the different parts 7*a*, 7*b* of the blowing channel 7, one feeding air to the left-hand-side parts 7*a* of the blowing channels 7 and the other feeding air to the right-hand-side parts 7*b* of the blowing channels 7, by separately adjusting the blowers in question the blowing force of the heating air blown from the different parts 7*a*, 7*b* of the blowing channel 7 against the glass sheet 5 may be separately adjusted, which consequently allows the transverse temperature profile of the glass sheet 5 to be adjusted. So, the tempering furnace 1 may feature a dedicated blower 9 for both parts 7*a*, 7*b* of the blowing channel 7. The blowing force may be adjusted by using an inverter, for example, to adjust the blower and thus the flow rate of the heating air stream that the blower produces.

Each blowing channel 7 or its part 7*a*, 7*b* of the tempering furnace 1 in the longitudinal direction of the tempering furnace 1, in other words, in the direction of travel of the glass sheet 5, may comprise a dedicated blower, which is controlled separately of the blowers in the other blowing channels or their parts. It is additionally possible that two or more blowing channels, or their parts 7*a*, 7*b*, in the longitudinal direction of the tempering furnace 1 have a common blower. The longitudinal temperature profile of the glass sheet 5 may be adjusted in the longitudinal direction of the tempering furnace 1 at as many locations as there are blowers 9 arranged in the tempering furnace 1.

In the embodiment of FIGS. 1 and 2, the blowing channel 7 is formed in the transverse direction in relation to the direction of travel of the glass sheet 5 out of two separate parts 7*a*, 7*b*, but the blowing channel 7 may also be formed in the transverse direction in relation to the direction of travel of the glass sheet 5 out of more than two separate parts. Subsequent blowing channels 7 in the direction of travel of the glass sheet 5 may also each comprise a unique quantity of blowing channel 7 parts in question. It is furthermore possible that only some of the blowing channels in the direction of travel of the glass sheet 5 are formed of separate parts while the other blowing channels are formed of one part.

In the longitudinal direction of the glass sheets 5, in other words in their direction of travel, the temperature profile of the glass sheets 5 may be adjusted with the aid of blowing heating air by adjusting the amount and/or blowing force of the air blown through the parts 7*a*, 7*b* of successive blowing channels 7 in the direction of travel of the glass sheets 5.

The tempering furnace 1 further has blowing channels 15 of the bottom part 4, positioned in the space restricted by the bottom part 4 and located below the glass sheet 5, or lower blowing channels 15, which are arranged to blow heating air on the bottom surface of the glass sheet 5 in order to heat the glass sheet 5. Advantageously, there are several successive said blowing channels 15 in the direction of travel of the glass sheet 5, that is, in the longitudinal direction of the tempering furnace 1. The blowing channels 15 are arranged substantially transverse in relation to the direction of travel of the glass sheets 5 so that they blow heating air to the bottom surface of the glass sheet 5 in the substantially transverse direction in relation to the direction of travel of the glass sheets 5. In this context, the definition substantially transverse means in an embodiment that the blowing channels 15 in the bottom part 4 are at a 70-110 degree angle with respect to the direction of travel of the glass sheets 5. According to another embodiment, the blowing channels 15 in the bottom part 4 are at an 80-100 degree angle with respect to the direction of travel of the glass sheets 5. According to yet another embodiment, the blowing channels 15 in the bottom part 4 are at an 85-95 degree angle with respect to the direction of travel of the glass sheets 5.

The heating air is fed to the blowing channel 15 through the bottom part feeding channel 16 where air is blown with the blower 17. The air is circulated back to the blower 17 from the bottom part 4 of the tempering furnace 1 through the return channel 18. The blowing channel 15 in the bottom part 4 further features a feed part 19, perforated plate 20, and blow part 21. As regards their operation, the feed part 19, perforated plate 20 and blow part 21 of the blowing channel 15 in the bottom part correspond to the feed parts 11*a*, 11*b*, perforated plate 12, and blow parts 13*a*, 13*b* of the parts 7*a*, 7*b* of the blowing channel 7 in the top part 3. The heating air is blown from the blow part 21 towards the rolls 6 and the bottom surface of the glass sheets 5 by nozzles 22. The nozzles 22 may be elongated, tubular channels. With such elongated nozzles, the air stream can be effectively and precisely made to reach the desired location, even from a somewhat longer blowing distance.

In the embodiment according to FIG. 1, the blowing channels 15 in the bottom part 4 comprise only one part in the transverse direction in relation to the direction of travel of the glass sheet 5, whereby it is not possible, in the embodiment of FIG. 1, to adjust separately the temperature profile of the glass sheet 5 in its transverse direction on the different parts of the glass sheet 5 in its transverse direction by the heating air blown through the blowing channels 15 in the bottom part 4. However, as to both their structure and operation, the blowing channels 15 in the bottom part 4 may also be implemented similarly to the blowing channels 7 in the top part 3, whereby it is also possible to adjust separately the temperature profile of the glass sheet 5 in its transverse direction on the different parts of the glass sheet 5 in its transverse direction by the heating air blown through the blowing channels 15 in the bottom part 4.

FIG. 2 shows an embodiment where the ends 23 of the parts 7*a*, 7*b* that are against each other in the blowing channels 7 are shaped oblique. The fact that the ends 23 of the parts 7*a*, 7*b* in the blowing channels 7 are shaped oblique means that the direction of the end 23 differs from the direction of travel of the glass sheets 5 by at least 5 degrees. According to an embodiment, the obliqueness of the end 23 is at least 10 degrees, for example. According to another embodiment, the obliqueness of the end 23 is 20-55 degrees.

When the ends 23 of the parts 7*a*, 7*b* in the blowing channels 7 are made oblique, there will be no temperature difference developing on the glass sheet 5 at the ends 23. This is due to the fact that the glass sheets 5 are moved during heating, and because the opposing ends 23 of the parts 7*a*, 7*b* in the blowing channel 7 are oblique in relation to the direction of travel of the glass sheets 5, the blowing discontinuity spot occurring at the ends 23 will not affect any one location on the glass sheet for an extended period of time.

FIG. 2 additionally shows an embodiment where the channel parts 7*a*, 7*b* of the blowing channels 7 inside the tempering furnace 1 are of different length, whereby the ends 23 of the parts 7*a*, 7*b* in two successive blowing channels 7 in the direction of travel of the glass sheets 5 are not at the same location, at least not in every location of the transverse direction of the glass sheets 5. In the embodiment of FIG. 2, two successive blowing channels 7 in the direction of travel of the glass sheets 5 are formed in such a manner that the ends 23 of their parts 7*a*, 7*b* are at the same location in the transverse direction of the glass sheets, and after that there are two blowing channels 7 with the ends 23 of their parts 7*a*, 7*b* in different locations in the transverse direction of the glass sheets 5, in relation to the ends 23 of the parts 7*a*, 7*b* in the previous two blowing channels 7. This type of interleaving of the location of the ends 23 of the parts 7*a*, 7*b* in the blowing channel 7 is also used to avoid the forming of any discontinuity spots in the blowing, and consequently unevenly heated locations on the glass sheet surface. The interleaving of the ends 23 may be applied together with the obliqueness of the ends 23, as shown in FIG. 2. The interleaving of the ends 23 may also be applied when the ends 23 are straight.

As regards manufacturing, the different parts 7*a*, 7*b* of the blowing channels 7 may be all made the same length, but arranged at different depths inside the tempering furnace 1 in its transverse direction, resulting in that their length inside the tempering furnace 1 are different, but from the point of view of manufacturing it is simple and easy to make the parts 7*a*, 7*b* of the blowing channels 7.

The tempering furnace 1 further has, in its top part 3, heating resistor rows 25, which are also arranged substantially transverse in relation to the direction of travel of the glass sheets 5. In this case, too, the definition substantially transverse in relation to the direction of travel of the glass sheets 5 means that in an embodiment the heating resistor row 25 is at a 70-110 degree angle with respect to the direction of travel of the glass sheets 5. According to another embodiment, the heating resistor row 25 is at an 80-100 degree angle with respect to the direction of travel of the glass sheets 5, and according to yet another embodiment the heating resistor row 25 is at an 85-95 degree angle with respect to the direction of travel of the glass sheets 5.

The blowing channels 7 and the heating resistor rows 25 may be mutually parallel. Typically, this takes place in such a case where the heating resistor rows 25 are arranged inside the blowing channels 7, for example inside the blow parts 13*a*, 13*b*, to heat the air blown from the blowing channels 7. This is exactly the embodiment shown in FIGS. 1 and 2. It is, however, possible to arrange the heating resistor rows 25 and the blowing channels 7 in slightly differing directions, as long as both of them are arranged substantially transverse in relation to the direction of travel of the glass sheets 5.

The heating resistor row 25 comprises a plurality of parts 26 that may be separately controlled. The separately-controllable part 26 of the heating resistor row 25 may be a single elongated resistor, so in this case there are several successive elongated resistors in a row in the heating resistor row. In the accompanying drawings 1 and 2, the parts 26 in the heating resistor row 25 are for the sake of clarity shown as one, elongated part. A single part 26, however, typically consists of several adjacent and separate heating resistor rods, whereby air can flow between them, at the same time effectively heating the air.

At the end of each of the separately controllable parts 26 in the heating resistor row 25 there is a piece 27, typically of a ceramic. The piece 27 is platelike, which may also be called a plate, dividing the blow parts 13*a*, 13*b* into compartments in accordance with the separately controllable parts 26, whereby the transverse temperature profiling of the glass sheet 5 may be further defined by means of the separately controllable parts 26 of the heating resistor rows 25.

The tempering furnace 1 further has heating resistor rows 28 in its bottom part 4, whereby each heating resistor row 28 comprises separately controllable parts 29. The heating resistor rows 28 and the separately controllable parts 29 of the heating resistor row 28 arranged in the bottom part 4 correspond to the top heating resistor rows 25 and the separately controllable parts 26 of the heating resistor row 25, described in the above. At the end of the separately controllable parts 29 there are pieces 30, typically of a ceramic. The pieces 30 correspond to the pieces 27 described in the above.

FIG. 1 also schematically describes a control unit 31. The control unit 31 makes it possible to control the various devices of the tempering furnace 1, such as the blowers 9 and 17, valves 24*a*, 24*b* and the conveyor, as well as other similar parts. However, most of the controllable items are not illustrated in FIG. 1 for reasons of clarity. Instead, FIG. 1 illustrates, by reference number 32, how the control unit 31 is used to adjust the separately controllable parts 26 and 29 on the heating resistor rows 25 and 28. The accompanying drawings do not show the mountings, cablings, and similar items of the heating resistor rows 25 and 28 for reasons of clarity.

By separately adjusting the separately controllable parts 26 and 29 in the heating resistor rows 25 and 28, the temperature profile of the glass sheet 5 may easily and effectively be adjusted in the transverse direction in relation to its direction of travel. In particular when the heating resistor rows 25 and 28 are arranged in the blowing channels 7 and 15 they can be effectively used to adjust the temperature of the air blown onto the glass sheet 5. When the blowing channels 7, 15 are substantially transverse in relation to the direction of travel of the glass sheets, there will be no longitudinal discontinuity spots forming on the glass sheet in its direction of travel, but the temperature can be kept even in the transverse direction.

As illustrated in FIG. 2, successive heating resistor rows 25 in the direction of travel of the glass sheets 5 may be so arranged that their separately controllable parts 26 are arranged in such a manner that their forward ends and tail ends are at different locations in the transverse direction in relation to the direction of travel of the glass sheets 5. The embodiment of FIG. 2 has two successive heating resistor rows 25 arranged in such a way that the forward ends and tail ends of their separately adjustable parts are at the same location in the transverse direction in relation to the direction of travel of the glass sheets 5, and after that there are again two successive heating resistor rows with the forward ends and tail ends of their separately adjustable parts in a different location with respect to the previous ones in the transverse direction in relation to the direction of travel of the glass sheets 5, etc.

By interleaving the separately adjustable parts 26, such a feature is established that the transverse temperature profile of the glass sheet 5 can be adjusted more precisely than what the quantity of the separately controllable parts 26 in the resistor row 25 is. If the heating resistor row 25 is divided into six separately controllable parts 26, the tempering furnace will in such a case have six adjacent adjustment areas of the transverse profile, if the separately controllable parts 26 are located in precise succession in the direction of travel of the glass sheets 5. If interleaving is used instead, as illustrated in FIG. 2, for example, the transverse profile can be adjusted in eleven separate zones as illustrated by the reference number 33 in FIG. 2. Therefore the adjustment of the transverse profile can be made most accurate in a simple manner. Advantageously the heating resistor row 25, 28 is divided into at least three separately controllable parts 26, 29.

In connection with FIG. 1, it is set forth that the transverse profile of the glass sheet temperature may be adjusted both from the top and below of the glass sheet. If desired, the transverse profile of the glass sheet may be adjusted from the top, only. If the transverse profile of the glass sheet temperature is only adjusted from the top of the glass sheet, the heating means under the glass sheet may be formed simpler than what is described in the drawings. In such a case, the heating resistors do not necessarily need separately controllable parts, for example, but the heating resistor may be substantially of the length of the transverse direction of the tempering furnace. Furthermore, heating resistors and blowing channels are not necessarily required on both sides of the glass sheets, but their heating may be implemented by utilizing blowing channels, only.

FIG. 1 shows that the heating resistor rows are arranged inside the blowing channels to heat the air being blown. However, the heating resistors may also be arranged outside of the blowing channels. In the embodiment of FIGS. 1 and 2, there is a small gap between successive blowing channels in the direction of travel of the glass sheets, but if the heating resistors are arranged further from the glass sheet being heated than the blowing channels, for example, a wider gap than the one shown in FIG. 2 needs to be left between the blowing channels so that the radiation from the resistors effectively heats the glass sheets.

Figure 3:
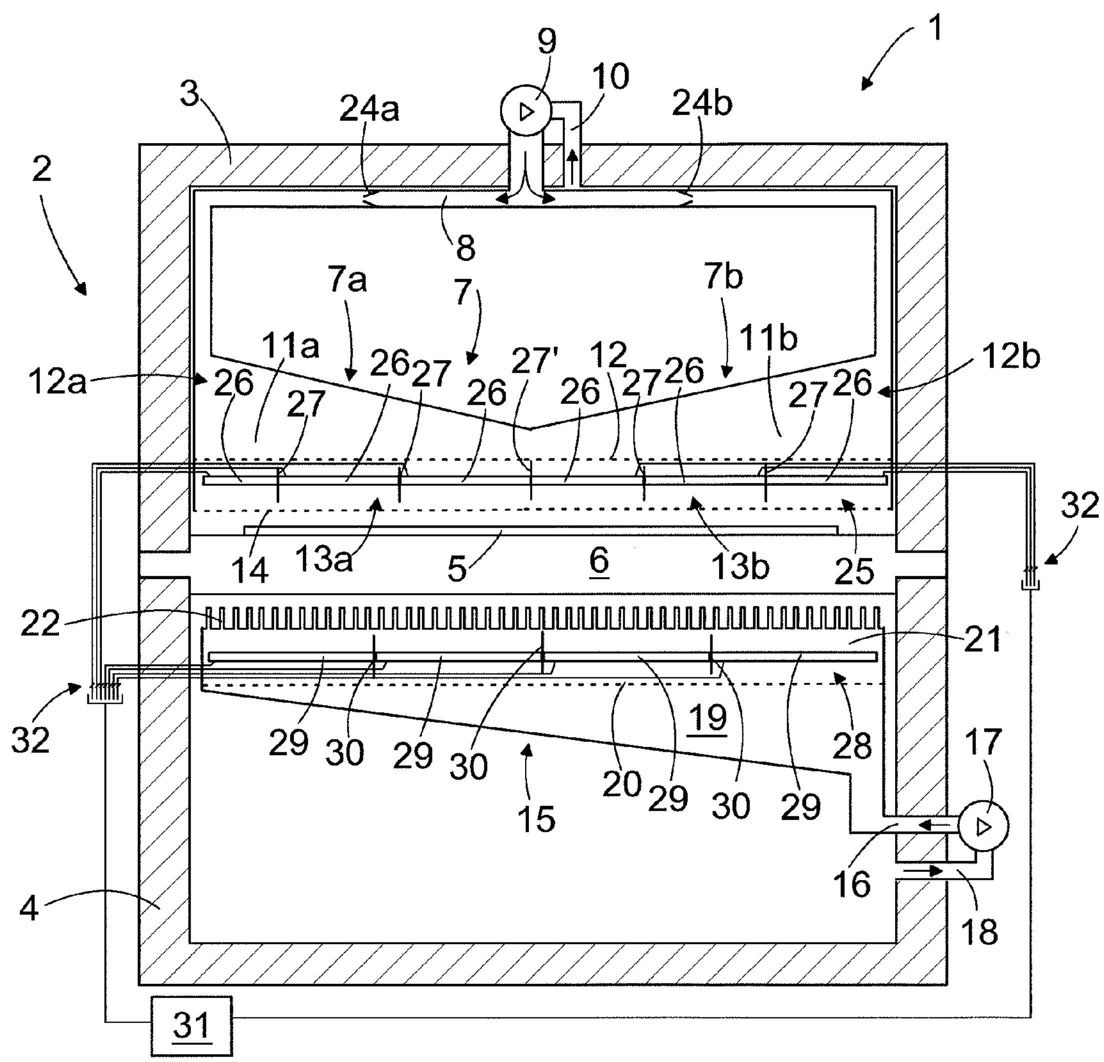
FIG. 3 is a schematic cross-sectional end view of a second glass tempering furnace.

FIG. 3 is a schematic cross-sectional end-view representation of a second glass tempering furnace 1. The structure of the tempering furnace 1 of FIG. 3 corresponds to the structure of the tempering furnace 1 of FIG. 1 in other respects, but differs as concerns the blowing channels 7 in the top part 3 of the tempering furnace 1. In FIG. 3, each blowing channel 7 is uniform, but comprises pieces 27, 27' that divide the blowing channel 7 in its bottom part, that is, as seen in the vertical direction, into several blowing channel parts at the blow parts 13*a*, 13*b* of the blowing channel 7. The heating air is fed into the blowing channel 7 through a feeding channel 8. In the substantially transverse direction in relation to the direction of travel of the glass sheet 5, the feeding channel 8 is in connection with the opposing ends of the blowing channel 7 located at the side edges of the tempering furnace 1, whereby the heating air is blown on the surface of the glass sheet 5 through the blowing channel 7 in the substantially transverse direction in relation to the direction of travel of the glass sheet 5 as separate heating air streams from the direction of the opposing edges of the glass sheet 5.

At its minimum, the blowing channel 7 comprises, on the center section of the blowing channel 7, in the transverse direction in relation to the direction of travel of the glass sheet 5, only the piece 27' which divides the blowing channel 7 into two blowing channel parts 7*a*, 7*b* into which heating air is fed in the substantially transverse direction in relation to the direction of travel of the glass sheet 5 as separate heating air streams from the direction of the opposing edges of the glass sheet 5. So, the glass tempering furnace 1 of FIG. 3 has a uniform blowing channel 7 in the transverse direction in relation to the direction of travel of the glass sheet 5, which is divided in the bottom part by at least one piece 27' into at least two blowing channel parts 7*a*, 7*b* whereas FIG. 1 shows a blowing channel 7 consisting of two separate blowing channel parts 7*a*, 7*b*. The piece 27' on the center section of the blowing channel 7 in two successive blowing channels 7 in the direction of travel of the glass sheet 5 is positioned in different locations in the transverse direction in relation to the direction of travel of the glass sheet 5, whereby it is possible to avoid any discontinuity spots from forming in the blowing and thus locations that are unevenly heated on the surface of the glass sheet. Both in the embodiment according to FIG. 1 and in the embodiment according to FIG. 3, the opposing location of the blowing channel parts 7*a*, 7*b* is positioned in the direction of travel of the glass sheet 5 in at least two successive blowing channels 7, 15 in a different location in the substantially transverse direction in relation to the direction of travel of the glass sheet 5. In the embodiment of FIG. 1, said opposing location of the blowing channels parts 7*a*, 7*b* therefore corresponds to the location where the ends 23 of the parts 7*a*, 7*b* in the blowing channels 7 are positioned. In the embodiment of FIG. 3, said opposing location of the blowing channel parts 7*a*, 7*b* corresponds to the location where the piece 27' is positioned.

In the embodiment according to FIG. 3, it is also possible to use two blowers 9 one of which feeds air to the end of the blowing channel 7 on the left in the tempering furnace 1 as shown in FIG. 3, and the other feeds air to the end of the blowing channel 7 on the right in the tempering furnace 1, whereby by separately adjusting the blowers in question it is possible to adjust separately the heating air streams blown from the direction of opposing edges of the glass sheet 5 and consequently to adjust the transverse temperature profile of the glass sheet 5.

It is obvious for a person skilled in the art that as the technology advances the basic idea of the invention may be implemented in various ways. The invention and its embodiments are thus not restricted to the above-described examples but may vary within the scope of the claims.

The invention claimed is:

1. A glass tempering furnace for heating glass sheets, the glass tempering furnace comprising:

a conveyor to carry the glass sheet into the glass tempering furnace and out of the glass tempering furnace; and a blowing channel, wherein a length direction of the blowing channel is substantially perpendicular to a direction of travel of the glass sheet, wherein the blowing channel is formed having a length and a width, the blowing channel being formed along a length direction of the blowing channel out of at least two blowing channel parts, the length of the blowing channel extending along a width direction of the glass tempering furnace, the blowing channel being arranged to blow heating air substantially along the width direction of the glass tempering furnace, the blowing channel extending over an effective width of the glass tempering furnace, wherein the glass tempering furnace further comprises a feeding channel that feeds the heating air to the blowing channel, wherein top sections of each of the at least two blowing channel parts include respective feed parts, forward ends of the feed parts being connected to the feeding channel, the feed parts becoming narrower towards a middle part of the glass tempering furnace and in a direction of the flow of the heating air, wherein, at a bottom surface of each of the feed parts include respective blow parts, and wherein, at a bottom surface of the blow parts is a nozzle plate.

2. The glass tempering furnace as claimed in claim 1, wherein an opposing location of the blowing channel parts is positioned in the direction of travel of the glass sheet in at least two successive blowing channels in a different location in the length direction of the blowing channel.

3. The glass tempering furnace as claimed in claim 1, wherein the blowing channel in the glass tempering furnace comprises at least one piece that divides the blowing channel into the at least two blowing channel parts.

4. The glass tempering furnace as claimed in claim 3, wherein the piece in a center portion of the blowing channel in the length direction of the blowing channel is positioned in a different location in at least two successive blowing channels in the direction of travel of the glass sheet.

5. The glass tempering furnace as claimed in claim 1, wherein the blowing channel is formed out of at least two separate blowing channel parts.

6. The glass tempering furnace as claimed in claim 5, wherein opposing ends of the blowing channel parts are formed obliquely.

7. The glass tempering furnace as claimed in claim 5, wherein the two separate blowing channel parts in at least two successive blowing channels in the direction of travel of the glass sheet in the glass tempering furnace are of different length, whereby their ends are positioned in different locations in the length direction of the blowing channel.

8. The glass tempering furnace as claimed in claim 1, wherein the glass tempering furnace comprises heating resistor rows placed on top of and/or below the glass sheet, the heating resistor row being arranged in the length direction of the blowing channel, and the heating resistor row has at least three separately controllable parts, whereby the temperature profile of the glass sheet in the length direction of the blowing channel is adjustable by separately adjusting the different parts of the heating resistor row.

9. The glass tempering furnace as claimed in claim 8, wherein at least two successive heating resistor rows in the direction of travel of the glass sheet are divided into parts in different locations in the length direction of the blowing channel, whereby the temperature profile of the glass sheet may be adjusted in the length direction of the blowing channel more precisely than what the quantity of the separately adjustable parts in one heating resistor row is.

* * * * *